June 29, 1971  L. BRIDGE ET AL  3,589,940
DEEP SUBMERGENCE BATTERY HAVING GAS BUBBLE-ELECTROLYTE
SCRUBBING VENT CAP
Filed April 14, 1970
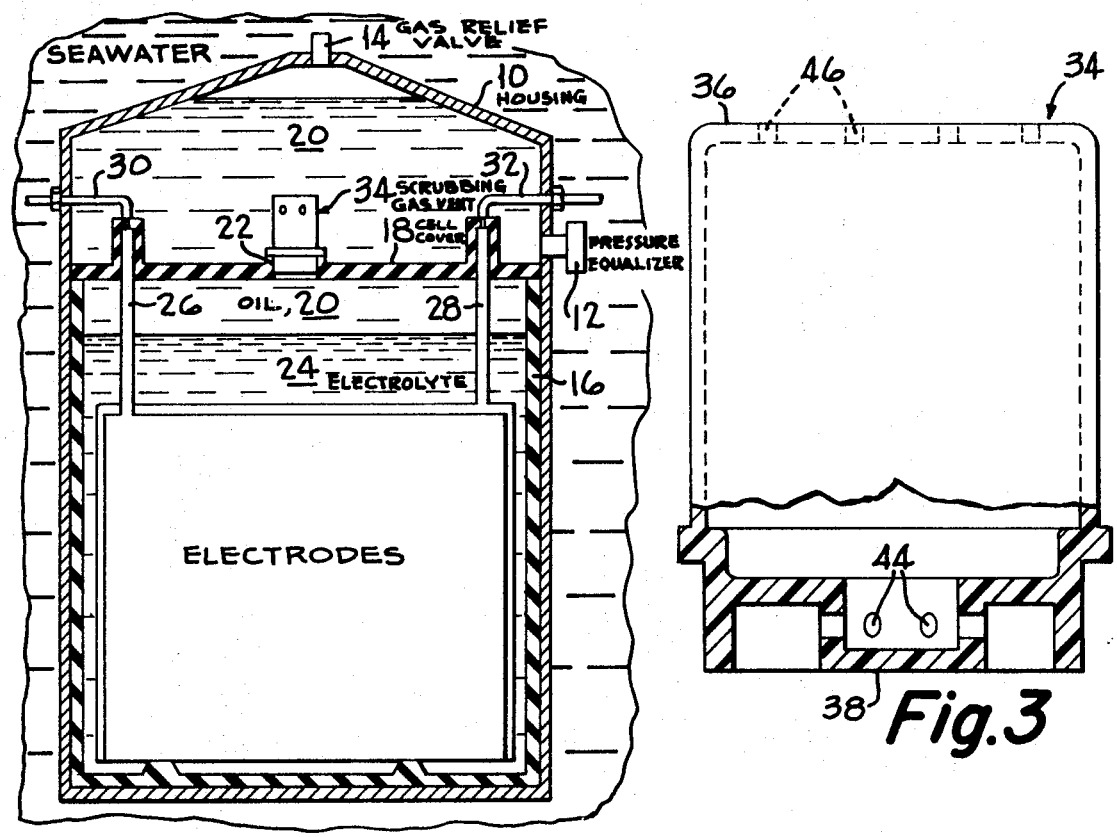
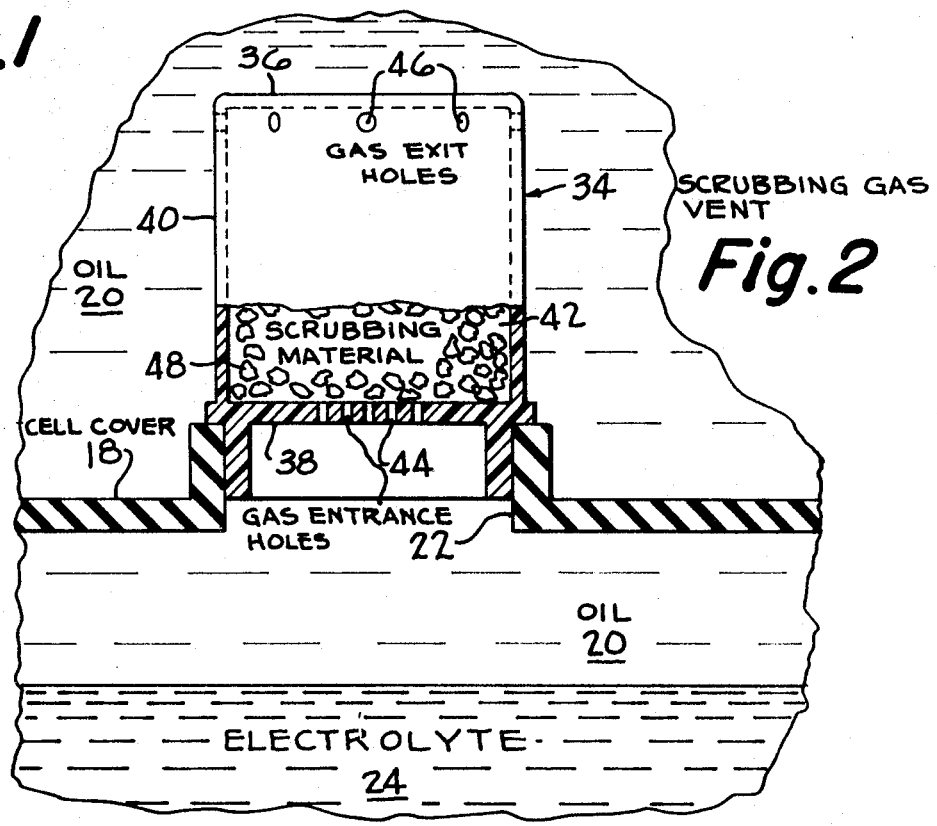

United States Patent Office 3,589,940
Patented June 29, 1971

3,589,940
DEEP SUBMERGENCE BATTERY HAVING GAS BUBBLE - ELECTROLYTE SCRUBBING VENT CAP
Laurence Bridge, Cornwell Heights, Walter J. Horner, Willow Grove, and Harold F. Thiel, Cornwell Heights, Pa., assignors to ESB Incorporated
Continuation-in-part of application Ser. No. 762,893, Sept. 26, 1968. This application Apr. 14, 1970, Ser. No. 28,366
Int. Cl. H01m 1/06
U.S. Cl. 136—6
6 Claims

ABSTRACT OF THE DISCLOSURE

A pressure equalized deep submergence battery for immersion in a salt or fresh water medium having an oil-electrolyte interface beneath the cell cover is provided with a vent cap in the cover which scrubs drops of electrolyte from the discharge gas bubbles as they pass through the cell.

CROSS-REFERENCE TO RELATED APPLICATION

This is a continuation-in-part of our application filed Sept. 26, 1968, Ser. No. 762,893.

BACKGROUND OF THE INVENTION

So they will not be crushed by the water pressure at great depths, liquid electrolyte deep submergence batteries for use in seawater or fresh water must be so constructed that the pressure of the liquid inside the battery equals the pressure of the liquid outside. One way to achieve the pressure equalization is by providing an opening in the cover of each cell in the battery, but this creates the problem that to prevent unwanted discharge of the battery into the water the electrically conductive water must be kept away from contact with the electrolyte inside each cell. To prevent this discharge from occurring and to prevent the water and electrolyte from mixing it is customary to have a layer of non-conductive oil or other liquid between the water and the electrolyte, which oil is contained in a housing which must also be pressure equalized. The housing containing the battery and oil is then immersed in water. The pressure equalized housing and the oil are the media through which the pressure of the water outside the housing is transmitted to the electrolyte in the interior of the battery, and the oil is also an electrical non-conductor which insulates the battery terminal posts and electrodes from discharge against the water or housing. For constructions embodying these general principles see U.S. Pat. Nos. 3,160,525 (issued to W. E. Hutchison et al. on Dec. 8, 1964) and 3,166,446 (issued to W. E. Hutchison on Jan. 19, 1965).

As the pressure equalized battery is submerged the increasing pressure causes the electrolyte to be compressed into a decreasing volume, and to be sure that the battery always has sufficient electrolyte even at great depths it has been common to provide an inverted collapsible bottle or reservoir containing excess electrolyte atop each cell of the battery; the collapsible bottle also serves as a pressure equalizing device. The interface of non-conductive oil and electrolyte is then in the bottle or reservoir rather than beneath the cell covers. (For a deep submergence battery also having an inverted bottle of excess electrolyte mounted atop each cell, see U.S. Pat. No. 3,208,884, issued to D. C. Jensen on Sept. 28, 1965. With Jensen's construction the battery is not situated in a housing filled with oil, and therefore there is no oil-electrolyte interface.) Use of these bottles or reservoirs atop the cells has produced several problems, however. In addition to increasing the cost of the construction the bottles also increase the height substantially and sometmes this is undesirable; the increased height means that there is greater height in the housing, increasing the cost of the housing and increasing the volume of non-conductive oil required to fill it. Such normal maintenance and inspection of the battery as addition of electrolyte and checking the specific gravity of the electrolyte is made difficult when a bottle must first be removed from atop each cell before this work can be done. Also, where the tops of the bottles were provided with an unchecked hole or opening to permit gas bubbles to be vented from the interior of the battery (see the Hutchison Pat. No. 3,160,525) there was a tendency for the electrolyte to splash out through these holes, possibly causing corrosion to the housing and other apparatus and creating a conductive path through the oil which could facilitate discharge of the battery electrodes against the housing. The tendency for electrolyte to splash out of the bottles could be eliminated by placing a gas venting valve in the hole at the top of each bottle (see the Hutchison Pat. No. 3,166,446; see also the Jensen patent). The bottles have employed valves designed both to permit the flow of gases out of the cell and to prevent the flow of liquids into or out of the cell (see the Jensen and Hutchison patents, respectively), and while satisfactory for their intended purposes these valves have not been designed to remove drops of electrolyte from the gas bubbles while the bubbles pass through the layer of oil. The escaping gas bubbles actually carry drops of electrolyte in their interiors, and excessive escape of these electrolyte drops can cause undesirable corrosion of both the surrounding housing and other apparatus, can create a conductive path through the oil outside the battery case which can facilitate discharge of the electrodes, and can reduce the quantity of electrolyte inside the cell and thereby limit the ability of the electrodes to charge and discharge as desired. The gas bubbles are difficult to break up since they are in the layer of oil as they pass through the gas valve or scrubbing device.

Other batteries not having an oil-electrolyte interface have been provided with vent caps designed to perform a variety of tasks. Some vent caps have been packed with a material intended to condense rising vapors; see U.S. Pat. No. 1,770,974 (issued to C. H. Everett on July 22, 1930). Other vent caps have been filled with materials which absorb rising vapors; see U.S. Pat. No. 1,583,648 (issued to R. C. Benner on May 4, 1926). Still other vent caps contain materials which seek to chemically combine the rising gases, either by having the vent cap filler materials react chemically with the rising gases as is shown in U.S. Pat. No. 3,287,174 (issued to T. J. Hennigan et al. on Nov. 22, 1966) or by functioning as catalysts; for vent caps containing catalytic materials, see U.S. Pat. Nos. 2,615,062 (issued to P. H. Craig on Oct. 21, 1952), 2,687,448 and 2,687,449 (issued to H. M. Gulick et al. on Aug. 24, 1954), 3,038,954 (issued to J. N. Pattison et al. on June 12, 1962), and the Hennigan et al. patent listed above. These references listed above are intended to be only illustrative of those showing vent plugs designed for purposes other than to scrub electrolyte drops from gas bubbles passing through layers of oil.

SUMMARY OF THE INVENTION

This invention is concerned with a deep submergence battery in which the battery is immersed in a non-conductive oil and in which the oil has access to the interior of each cell to create an oil-electrolyte interface beneath the cover of each cell. The invention is applicable to single cell and multicell batteries, and is applicable to a variety of electrochemical couples including, but not necessarily limited to, lead-acid, silver-zinc, nickel-iron, nickel-cadmium, and silver-cadmium couples.

The cover of each cell is provided with an opening into which a scrubbing vent plug is fitted. The interior of this scrubbing vent plug is provided with a chamber, and holes near the bottom and near the top of the vent plug permit gas bubbles to pass into and out of the chamber. The tortuous path required for the gas bubbles to pass through the vent plug causes the bubbles to break, causing the drops of heavier electrolyte to return downward to the electrolyte within the cell. The tortuous path is made more difficult and the vent cap is made more effective by filling the chamber with a scrubbing material between or through which the gas bubbles must pass, and by providing the gas exit holes at the top of the side walls of the vent plug rather than in the upper surface of the plug.

BRIEF DESCRIPTION OF THE DRAWINGS

FIG. 1 shows a pressure-equalized housing containing a non-conductive oil in which a battery is submerged. The oil has access to the interior of each cell through the scrubbing vent plug and creates an oil-electrolyte interface beneath the cover of each cell. In the cover of each cell is the scrubbing vent plug with which this invention is concerned.

FIG. 2 shows an enlarged cross-section containing the vent plug of this invention fitted into an opening in the cell cover. The vent plug of FIG. 2 is shown having its chamber partially filled with scrubbing material, with the gas entrance holes in the lower surface of the gas chamber, and with the gas exit holes at the top of the side walls of the vent plug.

FIG. 3 is the vent plug in partial section showing alternative details of the construction.

DESCRIPTION OF THE PREFERRED EMBODIMENTS

FIG. 1 shows in general terms a construction embodying the present invention. A housing 10 equipped with a pressure equalizing device 12 and a gas relief valve 14 contains a battery or cell 16 over the top of which is a cell cover 18. The interior of the housing is filled with an electrically non-conductive oil or other liquid 20 which has access to the interior of the battery through an opening 22 in the cover. (Throughout the remainder of this discussion and in the claims the word "oil" will be used to mean any electrically non-conductive liquid which floats on top of the electrolyte and is compatible with the electrolyte, housing, and other components of the combination. While there may be some such liquids which are technically not "oils," the term "oil" will be used for sake of simplicity since the liquids commonly used for this purpose are oils.) The oil and electrolyte 24 form an interface beneath the cover, and the oil extends above the cell cover. Positive and negative terminal posts 26 and 28 respectively lead from the electrodes within the battery case through the cover and are connected by cables 30 and 32 which extend through the housing walls. The drawing shows the cables 30 and 32 as being electrically insulated, but since the oil 20 serves as an insulator this separate insulation surrounding the cables is not an essential requirement. The construction shown in the drawing may have such additional standard features as are movable cover for the housing, liquid drains, etc., but further reference to them will be omitted since they are not germane to an understanding of the present invention.

One essential feature of batteries which are to be submerged very deeply is that the pressure of the liquids inside the housing 10 be made equal to the pressure of the liquids outside, and there are numerous constructions which would meet this requirement. The housing itself might be made from a material such as rubber, metal, or a plastic which is sufficiently flexible so that the container deforms in response to the outside pressure until the outside and inside pressures are equal. Alternatively the housing may be rigid and be provided with an externally or internally projecting appendage which equalizes pressure, or a pressure equalizing diaphragm may be built into an otherwise rigid wall of the housing. The construction shown in FIG. 1 is to this extent only schematic and is intended to include pressure equalized housings of all constructions. Arrangements to pressure equalize the housings are known (see the two Hutchison patents cited in the background) and all or a portion of the battery case itself may be sufficiently flexible to be a pressure equalizer (see the Orsino's U.S. Pat. No. 3,391,029).

Another frequently desirable but perhaps not always essential feature used in association with the housing is a gas relief valve. Again, there are many different types of valves which could be used (see the Hutchison, Jensen, and Orsino patents) and for simplicity a schematic representation of a valve is shown at the top of the housing. It is desirable but not essential to have the gas relief valve at the highest point in the housing, and the top of the housing shown in FIG. 1 is so constructed.

As was stated earlier, the oil 20 has access to the interior of the battery or cell through an opening 22 in the cell cover 18. Fitted into the opening by threads or otherwise is a scrubbing gas vent 34, shown briefly in FIG. 1 and in greater detail in FIG. 2. (While oil will pass through the gas vent 34 from the outside to the inside of the battery, it would be faster and frequently preferable to flood the interior of the housing with oil to a level above the cell cover before fitting the gas vent into the cover opening. In any event oil extends above the cell cover and surrounds the gas vent while the gas vent is in its operating position.) Portions of the vent plug may extend above and/or below the opening, or the plug may be entirely in the opening. The gas vent 34 has an upper surface 36, a lower surface 38, and side walls 40 which define a chamber 42 within the vent plug. The gas vent has at least one and preferably more gas entrance holes 44 in or near the bottom of the chamber and at least one and preferably more gas exit holes 46 near the top of the chambers. Preferably the entrance holes 44 are in the lower surface and the exit holes 46 are in the side walls, as shown in FIG. 2, but alternatively the entrance holes may be above the lower surface and the exit holes may be in the upper surface, as shown in FIG. 3; the stated preferred constructions provide easy access by the gas bubbles to the entrance holes and increase the tortuous path which the bubbles must travel to get out of the vent chamber.

Preferably the chamber of the gas vent contains scrubbing material 48 between or through which the gas bubbles must pass, as shown in FIG. 2. This material, which may be of many different constructions including matted or porous compositions or a collection of discrete particles, should be one which is chemically compatible with the electrolyte and oil, and materials such as plastics, some rubbers, ceramics, and others are compatible with both acid and alkaline electrolytes and with most oils. If the scrubbing material consists of a collection of discrete particles, the particles may be of any desired configuration, with angular chips being preferable to spherical particles in most instances since the sharp edges of the chips tend to break up the bubbles more readily than do the spherical particles; particles which tend to pack together without leaving open paths between themselves, such as rectangular particles, should be avoided. If there is to be a range of sizes of particles in the chamber both the maximum and minimum sizes as well as the gradation within the range are variables which should be determined by experimentation for each different application; the particles should provide a tortuous path for the gas bubbles which will break up the bubbles and cause the electrolyte drops to return to the interior of the battery case, and a gradation of particles which is too dense may restrict flow of gas bubbles. The particles should be of such size and configuration that they do not readily block or plug the gas entrance or exit holes, or both. The use of scrubbing material within the chamber of the gas vent is preferred but is not an essential requirement; a vent plug having no such scrubbing material, such as the one shown in FIG. 3, will work.

The size of the entrance and exit holes must also be carefully determined by experimentation, and should be large enough to permit the passage of gas, small enough to break up some of the bubbles, and not so large that the bubbles pass through with such ease that they are not broken. The size and number of the entrance and exit holes are thus related to the size and number of bubbles generated during charge or discharge, and these features are in turn dependent upon such factors as the electrochemical couple involved, the rate of charge or discharge, the type and amount of oil being used, the pressure and temperature in which the bubbling occurs, the geometrical configuration of the battery, and perhaps others. In general it has been found that the greatest diameter of the holes should not exceed approximately $3/16$ inch and preferably should not exceed approximately $3/32$ inch; the expression "the greatest diameter" is used so as to include not only the diameter of a circular hole but also the greatest diameter of an elliptical hole, the diagonal of a rectangular hole, etc.

From the description given above the construction and operation of our invention should be clear.

We claim:
1. A pressure equalized deep submergence battery for immersion in a water medium comprising the combination of:
   (a) a housing containing an electrically non-conductive oil, the housing having means for equalizing the pressure of the oil inside the housing with the pressure of the water outside the housing; and,
   (b) a battery situated within the housing, the battery having a cover over each cell, each cover being provided with an opening which provides access by the oil to the interior of the cell, each cell having an oil-electrolyte interface beneath the cover; and,
   (c) a scrubbing vent plug fitted into an opening in the cover of each cell, each vent plug having an upper surface, a lower surface, and side walls which define a chamber within the vent plug, the chamber containing only oil, the vent plug having at least one gas entrance hole near the bottom of the chamber and at least one gas exit hole near the top of the chamber, the greatest diameter of the holes being approximately $3/16$ inch.

2. The deep submergence battery of claim 1 in which the greatest diameter of the holes is approximately $3/32$ inch.

3. The deep submergence battery of claim 1 in which the gas entrance hole is in the lower surface of the chamber.

4. The deep submergence battery of claim 1 in which the gas exit hole is in the side walls of the chamber.

5. The deep submergence battery of claim 2 in which the gas entrance hole is in the lower surface of the chamber.

6. The deep submergence battery of claim 2 in which the gas exit hole is in the side walls of the chamber.

References Cited
UNITED STATES PATENTS

| | | | |
|---|---|---|---|
| 2,436,465 | 2/1948 | Wilson | 136—177 |
| 3,083,256 | 3/1963 | Slautterback | 136—177 |
| 3,160,525 | 12/1964 | Hutchison et al. | 136—166X |

DONALD L. WALTON, Primary Examiner

U.S. Cl. X.R.

136—177, 179